United States Patent
Hogge et al.

(10) Patent No.: US 6,596,837 B2
(45) Date of Patent: Jul. 22, 2003

(54) ABRASION RESISTANT COATED GOLF EQUIPMENT

(75) Inventors: Matthew F. Hogge, Mattapoisett, MA (US); Mitchell E. Lutz, Fairhaven, MA (US)

(73) Assignee: Acushnet Company, Fairhaven, MA (US)

(*) Notice: Subject to any disclaimer, the term of this patent is extended or adjusted under 35 U.S.C. 154(b) by 118 days.

(21) Appl. No.: 09/817,117

(22) Filed: Mar. 27, 2001

(65) Prior Publication Data

US 2002/0173384 A1 Nov. 21, 2002

(51) Int. Cl.⁷ .............................................. C08G 18/30
(52) U.S. Cl. ........................... 528/49; 528/28; 524/790; 427/385.5; 473/324; 473/378
(58) Field of Search .................... 427/385.5; 528/49, 528/28; 524/790; 473/324, 378

(56) References Cited

U.S. PATENT DOCUMENTS

| | | | |
|---|---|---|---|
| 2,939,710 A | 6/1960 | Dosmann et al. | 273/235 |
| 3,784,209 A | 1/1974 | Berman et al. | 273/218 |
| 3,989,861 A | 11/1976 | Rasmussen | 427/180 |
| 4,478,876 A | 10/1984 | Chung | 427/54.1 |
| 4,478,909 A * | 10/1984 | Taniguchi et al. | |
| 4,486,319 A | 12/1984 | Jamison | 252/12.2 |
| 4,539,048 A | 9/1985 | Cohen | 106/287.17 |
| 4,539,049 A | 9/1985 | Cohen | 106/287.17 |
| 4,642,247 A * | 2/1987 | Mouri et al. | |
| 4,798,386 A | 1/1989 | Berard | 273/235 R |
| 4,871,589 A | 10/1989 | Kitaoh et al. | 427/322 |
| 5,000,458 A | 3/1991 | Proudfit | 273/235 A |
| 5,158,289 A | 10/1992 | Okumoto et al. | 273/80 R |
| 5,260,350 A | 11/1993 | Wright | 522/42 |
| 5,300,325 A | 4/1994 | Nealon et al. | 427/379 |
| 5,409,233 A | 4/1995 | Kennedy | 273/235 A |
| 5,459,220 A | 10/1995 | Kennedy | 273/44 |
| 5,461,109 A | 10/1995 | Blair et al. | 524/839 |
| 5,853,809 A | 12/1998 | Campbell et al. | 427/407.1 |

FOREIGN PATENT DOCUMENTS

| | | |
|---|---|---|
| EP | 0 832 947 | 1/1998 |
| GB | 2177093 A | 1/1987 |
| GB | 2285401 A | 12/1995 |
| JP | 2-80069 | 3/1990 |
| JP | 4-166173 | 6/1992 |
| WO | WO 92/19656 | 11/1992 |

OTHER PUBLICATIONS

Gackter, Plastics Additives Handbook, 1993, pp. 544–547, (4th ed.).

Ken–React Reference Manual, p. 40, Kenrich Petrochemicals, Inc.

CRC Handbook of Chemistry & Physics, 52nd Edition 1971–1972 (pp. F–211–F–218), The Chemical Rubber Co., Cleveland, Ohio.

* cited by examiner

*Primary Examiner*—Rachel Gorr
(74) *Attorney, Agent, or Firm*—Swidler Berlin Shereff Friedman, LLP

(57) ABSTRACT

Golf equipment, or a portion thereof, with improved abrasion resistance is obtained by applying a coating comprising hard filler particles, a coupling agent and a polymer precursor preferably comprising a plurality of reactive monomers and/or oligomers. Colloidal silica may be used as the filler, silanes of the form $Y-(CH_2)_n SiX_3$, wherein Y is an organofunctional group providing the bonding with the polymer matrix attached to the central silicon atom via the stable $(CH_2)_n$ carbon chain and X represents the silicon-functional or alkoxy group that hydrolyzes and subsequently reacts with the active sites on inorganic surfaces. The coating may be hardened by curing with ultraviolet radiation or solvent evaporation and crosslinking.

46 Claims, No Drawings

ABRASION RESISTANT COATED GOLF EQUIPMENT

FIELD OF THE INVENTION

The present invention relates to a coating for golf equipment that is a two component curable composition that contains colloidal silica, reactive coupling agents, and a solvent system. Such a curable composition is particularly useful in golf equipment coating compositions that are curable at ambient, thermal, ultraviolet, electron beam, or some combination of the listed conditions. These compositions have been adapted for application to golf equipment, in particular golf balls, for improving the abrasion resistance of the so-coated surfaces.

BACKGROUND OF THE INVENTION

Materials used in forming golf ball covers, such as balata, SURLYN®, and urethane elastomer suffer from abrasion and shear produced by multiple oblique hits by a golf club. It is known to apply coatings to the surface of golf balls to increase the abrasion resistance of the coated surfaces but the results achieved with the use of such coatings has not entirely met the requirements of the golfing public. Thus, there is a need to improve the abrasion resistance of such coating materials.

More than five hundred million golf balls are produced each year. Most of these balls have covers molded from the ionomeric resin SURLYN® or its counterparts and, to a lesser extent, balata (i.e., trans polyisoprene). Conventionally, coating compositions are applied to the ball surface to protect the ball, the identifying indicia and any paint layers, and to add a pleasing appearance to the ball due to their high gloss. Typically such coatings comprise a clear primer coat and a clear top coat, although for certain applications a single top coat may suffice. The primer layer is applied to promote adhesion or to smooth the surface roughness before the top coat(s) are added to the golf ball. Coating compositions are generally free of pigmentation and are water white. However, they may contain small amounts of dye, pigment, and optical brighteners so long as they still allow for a bright ball cover. In golf balls of the type described above, the various identifying indicia may be applied either directly upon or alternatively upon the cover, the primer coat or the top coat.

Coating composition materials are well known in the art. Generally, they consist of urethanes, urethane hybrids, polyesters and acrylics. In particular, a cured polyurethane top coat is most widely used as a protective coating composition material. Polyurethane systems are typically either "one component" or "two component" systems. One component systems are generally made up of minute polymeric particles (reacted or partially reacted) which are suspended or dispersed in one or more solvents.

Curing and subsequent formation of a coating results from the evaporation of the solvent and/or the addition of a curing agent. The two component systems rely on keeping he primary reactants separate from one another until the time for forming the coating. Upon the addition of the reactants to one another, polymerization occurs. In forming such a coating, the reaction may be accompanied or followed by evaporation of the solvent. Typical two component polyurethane systems include separate packages of polyol and diisocyanate, which are mixed together to yield a thermoset coating composition. In some cases, more than one curing mechanism may be used to cure the coating system, i.e. evaporation of solvent via ambient air in addition to the coating be subjected to ultraviolet light. Polyurethane systems may be classified as either water-based or nonaqueous solvent-based systems. The following references are examples of polyurethane coating systems known in the golf ball art.

U.S. Pat. No. 3,784,209 discloses that golf balls can be painted via use of enamel, polyurethane, epoxy, acrylic or vinyl based coatings. However, system specific compositions and teaching of novel compositions are not provided.

U.S. Pat. No. 5,409,233 discloses a clear coating for a golf ball which comprises about 35–90% by weight of a polymer including a hydroxyl-containing resin an isocyanate such that an equivalent weight ratio of —NCO to —OH is in the range of 0.9 to 1.4, as well as up to 65% by weight of a solvent system including methylamyl ketone (MAK). This particular solvent system allows for an increased solids content (more than 45%) than that of conventional coatings (about 35%).

International Publication No. WO 92/19656 discloses a coating composition for golf balls which is a mixture of a hard acrylic polymer having a functionality reactive with an isocyanate and isocyanate-reactive modifiers, reacted together in a solvent with an isocyanate such as polyisocyanate. Golf balls employing such coatings are said to have improved hardness and flexibility.

U.S. Pat. No. 5,000,458 is directed towards a golf ball with an optical brightener incorporated in the primer coat, wherein the primer coat has an optical brightener admixed there such that the optical brightener constitutes about 0.45 to 2.7% by weight of the solids content of the primer coat.

U.S. Pat. No. 5,300,325 relates to a primer which improves the adhesion of a polyurethane top coat to a thermoplastic ionomer resin-based composition. The primer composition consists essentially of from about 90% by weight to about 96% by weight of a water-borne dispersion of acrylic resin or polyurethane resin or both and from about 4% to about 10% by weight of a polyfunctional aziridine.

U.S. Pat. No. 5,459,220 is directed towards a golf ball having an improved urethane top coat. The top coat is formed from a two-part polyurethane system wherein the first part contains a hydroxyl functional polyol and the second part contains a diisocyanate crosslinking agent selected from the group consisting of biurets of hexamethylene diisocyanate and isocyanurate trimers of hexamethylene diisocyanate. Top coats containing such crosslinking agents are said to exhibit superior adhesion and abrasion resistance, and superior non-yellowing properties upon exposure to U.V. radiation as compared to conventional top coats.

U.S. Pat. No. 5,461,109 discloses a water-reducible, two component polyurethane coating composition, wherein the first component comprises a compound having a hydroxyl functionality, an organic solvent, an optical brightener and water, and the second component comprises an aliphatic polyisocyanate and an organic solvent. The advantage of these water-reducible coating compositions is that they avoid the foaming problem generally associated with two component polyurethane systems. Additionally, these coating compositions may be applied to a SURLYN® covered ball without the need for a primer coat or an adhesion promoting layer.

U.S. Pat. No. 4,486,319 teaches that the lower the Melt Flow Index of the coating polymer, the higher the abrasion resistance of the composition.

U.K. Patent No. GB 2,285,401 A discloses a coated golf ball having a constant film thickness at the dimple edge using a urethane and/or an epoxy based paint containing one or more of the following silica, clay and calcium carbonate. Here, the silica and other noted materials are used to exhibit high viscosity at low shear forces, so the paint does not creep from the dimples. The silica used is solid and is described as a filler with levels not exceeding 3% by weight of paint resin. Use of a coupling agent is also described here, but is used to keep the silica and other noted materials from sedimentation.

U.K. Patent No. GB 2,177,093 A discloses an ultra-violet coating composition that comprises of a multifunctional epoxy oligomer and a finely powdered inorganic filler (such as silica) that has been surface treated via the hydrolysis with an epoxy-containing silane coupling agent.

U.S. Pat. Nos. 5,368,941, 5,260,350, and 4,478,876 disclose ultra-violet curing systems to cure aminofunctional or acryloxy functional silanes and colloidal silica to produce abrasion resistant hardcoats for use on glass, plastic, and polycarbonate substrates. While the coatings are abrasion resistant, they are intended for use when deformation is not critical.

U.S. Pat. No. 5,853,809 and EP 0,832,947 disclose a scratch resistant automotive coating that makes use of a resin system combined with colloidal silica and a coupling agent. More specifically, the patent teaches use of carbamate functional coupling agents and prefers reactions with aminoplast resins. While other systems are discussed, the curing range for all disclosed systems is between 93° C. and 177° C. Such temperatures would undesirably destroy a conventional golf ball cover during the coating process.

While some conventional coating systems, including a few of those described above, do impart a measure of abrasion and impact resistance, a continuing need exists for improved coatings capable of providing enhanced abrasion resistance and adherence to balls without negatively affecting the performance of the coated object.

SUMMARY OF THE INVENTION

The present invention is directed to an abrasion-resistant coating for golf equipment, or a portion thereof, in particular to a golf ball having a cover and a core.

In one embodiment, the abrasion-resistant coating includes: a reactive component A including a polyol or a mixture of polyol components and polymer precursors; a reactive component B comprising an isocyanate component which includes at least one of diphenylmethane 4,4'-diisocyanate, toluene diisocyanate, isophorone diisocyanate, or hexamethylene diisocyanate, and optionally an aziridine; colloidal silica present in an amount sufficient to increase the abrasion resistance of the coating; a coupling agent present in an amount sufficient to react with the colloidal silica; and a solvent, or a reaction product thereof. The reactive component A preferably includes at least one of a hydroxyl functional acrylic, hydroxyl functional polyester, hydroxyl functional polyester, hydroxyl functional polyether, polyamine, polyamide, alkyd, or epoxy resin with secondary hydroxyl group(s), phenolic resin, or hydroxyl functional resin. The coating can further include an optical brightener and/or at least one of a pigment, dye, tint, or filler, each in an amount sufficient to provide the coating with visible pigmentation. In one embodiment, substantially all of the coating remains adhered to the golf ball after repeated hits with a golf club. In another embodiment, the coating is cured by solvent evaporation from a water-based or organic-based solvent system.

In a second embodiment, the abrasion-resistant coating includes: an acid functional resin group comprising at least one of epoxy resins, acrylic resins, polyesters, polyethers, anhydrides, or polyamides; colloidal silica present in an amount sufficient to increase the abrasion resistance of the coating; a coupling agent present in an amount sufficient to react with the colloidal silica; and a solvent, or a reaction product thereof.

In a third embodiment, the coating includes: an unsaturated resin comprising at least one of a unsaturated carboxylic acid resin or an unsaturated vinyl resin; colloidal silica present in an amount sufficient to increase the abrasion resistance of the coating; a coupling agent present in an amount sufficient to react with the colloidal silica; and a solvent, or a reaction product thereof. Preferably, the coating further includes at least one free-radical initiator that preferably includes at least one thermal initiator or photoinitator. In one embodiment, each free-radical initiator includes at least one peroxide, azo compound, benzophenone, or combination thereof. The coating is preferably cured by at least one of heat or ultraviolet radiation.

In a fourth embodiment, the coating includes a reactive component A including a polyol or a mixture of polyol components and polymer precursors; a reactive component B comprising an isocyanate component which includes at least one of diphenylmethane 4,4'-diisocyanate, toluene diisocyanate, isophorone diisocyanate, or hexamethylene diisocyanate, and optionally an aziridine; an unsaturated resin including at least one of a unsaturated carboxylic acid resin or an unsaturated vinyl resin; colloidal silica present in an amount sufficient to increase the abrasion resistance of the coating a coupling agent present in an amount sufficient to react with the colloidal silica; and a solvent, or a reaction product thereof. Preferably, the coating includes at least one of thermal initiator or photoinitiator and is cured by at least one of heat, electron beam radiation, or ultraviolet radiation.

The invention is also directed to a method for reducing the amount of abrasion sustained by golf equipment, or a portion thereof, in particular to a golf ball cover during play, through application to the cover of a coating containing a colloidal silica and a coupling agent that, collectively, do not change the flexibility and/or the crosslink density of the coating. Specifically, golf equipment, or a portion thereof, in particular a molded golf ball, is covered with a coating including colloidal silica, a coupling agent, and reactive components A and B along with a solvent system. This permits the formation of a relatively soft coating having increased durability. In one embodiment, the curing includes solvent evaporation from a water-based or organic based solvent system. In another embodiment, the curing includes heat or ultraviolet radiation. In one embodiment, the curing occurs at a temperature of about 32° F. to 132° F.

In each of these embodiments, the colloidal silica is typically present in an amount of at least about 5 weight percent.

DEFINITIONS

The term "about," as used herein, should generally be understood to refer to both numbers in a range of numerals. Moreover, all numerical ranges herein should be understood to include each whole integer within the range.

As used herein, the term "golf equipment" is meant to refer broadly to any type of equipment used in connection with golf, including, but not limited to, golf balls, golf clubs (i.e., putters, drivers, and wedges) and club attachments, additions, or modifications, such as striking face inserts; golf club components (i.e., shafts, hosels, and grips); golf club vibration damping devices; golf gloves and portions thereof, such as glove liners, securing methods, patches, and reinforcements; golf shoes and associated components (i.e., soles, footbeds and spike socket spines, heel counters, toe "puffs," uppers, midsoles, outsoles, liners, and plastic golf spikes); golf bags and their associated framework, support legs, and stands; and any portion of the above items.

As used herein in reference to a golf ball, the term "core" represents the center and optional additional layer(s), such as an intermediate layer, which layer(s) is(are) disposed between the center and the cover of the golf ball.

As used herein, the term "polyol," refers to a compound containing at least 2 hydroxyl groups, regardless of its molecular weight. The term "polyamine," as used herein, refers to a compound containing at least 2 primary or secondary amine groups, regardless of molecular weight.

DETAILED DESCRIPTION OF THE INVENTION

The present invention relates to golf equipment, or a portion thereof having improved abrasion resistance obtained by incorporating colloidal silica within the coating material. A coupling agent is used to promote adhesion and dispersion and to form a matrix with the colloidal silica and the coating components, physically forming an integral part of the coating and increasing abrasion resistance without negatively affecting overall hardness.

The present invention also relates to a method of forming a coating composition which, upon application to a golf ball, improves the durability of such coated balls by enhancing their resistance to abrasion. The composition of the present invention includes reactive components A and B, a "hard" particle component, a coupling agent, and a solvent system, and optionally filler(s), additive(s), and the like.

In one embodiment, a one component system including an acid functional resin is used in place of reactive components A and B. Acid functional resins used in this invention include, but are not limited to, epoxy resins, acrylic resins, polyesters, polyethers, anhydrides, polyamides, and mixtures thereof.

In another embodiment, a one component system including an unsaturated resin is used in place of reactive components A and B. Unsaturated resins used in this invention preferably include, but are not limited to, radically catalyzed materials containing unsaturated resins, such as unsaturated carboxylic acid resins, unsaturated vinyl resins, or mixtures thereof.

Any suitable free-radical initiator can be included with the unsaturated resin to facilitate the cure thereof. Preferably, the initiator includes at least one peroxide, ultraviolet photoinitiator, visible-light photoinitiator, or a combination thereof. One particularly suitable class of ultraviolet photoinitiators includes benzophenones. The peroxide is preferably an organic peroxide. Exemplary initiators include di-t-amyl peroxide; di(2-t-butyl-peroxyisopropyl)benzene peroxide; 1,1-bis(t-butylperoxy)-3,3,5-trimethylcyclohexane, dicumyl peroxide; di-t-butyl peroxide; 2,5-di-(t-butylperoxy)-2,5-dimethyl hexane; n-butyl-4,4-bis(t-butylperoxy)valerate; lauryl peroxide; benzoyl peroxide; t-butyl hydroperoxide; and the like, and any mixture thereof. The peroxide, when included, is typically present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. The free-radical initiator may also be one or more sources such as an electron beam, UV or gamma radiation, x-rays, or any other high energy radiation source capable of generating free radicals. These materials can include ultraviolet and/or thermal curable materials.

Reactive component A typically includes at least one hydroxyfunctional polyol. The polyols of this invention can include one or more materials that contains a reactive hydrogen atom and that would react with the isocyanate or isocyanurate group. These materials include hydroxyl functional acrylics, hydroxyl functional polyesters, acid functional resins, hydroxy functional polyethers, polyamines, polyamides, short oil alkyds, caster oil, epoxy resins with secondary hydroxyl groups, phenolic resins, and hydroxyl functional vinyl resins, and mixtures thereof. If necessary, the vinyl resins may be used to promote adhesion. Reactive component A can include a mixture of polyols and polymer precursors. The polymer precursors can be radiation curable monomers or oligomers curable by a method including ultraviolet radiation, electron beam radiation, or heat, or a combination thereof. The reactive component A can also include pigments, tints, dyes, and fillers in an amount to provide visible coloration in the coating.

The preferred coatings are based on monomers and oligomers of acrylate, meth(acrylate) or water/solvent based urethane or epoxy functionalities. Through combinations of mono and multi-functional oligomers, highly cross-linked coatings can be delivered. The weight percentage of reactive monomer in the coating ranges from about 5 to 95% by weight of the entire coating composition.

Reactive component B typically includes at least one diisocyanate component including at least one of diphenylmethane 4,4'-diisocyanate, toluene diisocyanate, isophorone diisocyanate, hexamethylene diisocyanate, or mixtures thereof. In a preferred embodiment, reactive component B includes aziridine. In another preferred embodiment, reactive component B includes at least one photoinitiator.

The invention contains a relatively "hard" material that includes colloidal silica in an amount sufficient to increase the abrasion resistance of the coating, and optionally includes one or more types of organic or inorganic particles, which is dispersed throughout the polymer and bonded to at least one of the reactive components by the coupling agent. The colloidal silica can include untreated or pretreated colloidal silica(s), or silica related compounds, such as those sold commercially as Cab-O-Sil by Cabot Corp. of Tuscola, Ill. or NYACOL 2040 by Nano Technologies of Ashland, Mass., HYLINK OG series by Clariant Corporation of Charlotte, N.C., or the SNOWTEX series of colloidal silica by Nissan Chemical Industries of Tokyo, Japan. In one preferred embodiment, optional hard particles including corundum and oxides such as MgO, zirconium oxide or ZnO, can be included in the composition with the colloidal silica to improve the abrasion resistance. The colloidal silica is typically present in the coating material in an amount of greater than 5 weight percent, preferably about 5 to 80 percent, and more preferably from about 5 to 60 percent by weight of the composition. In one preferred embodiment, the colloidal silica is present in an amount of about 10 to 30 percent, and in another preferred embodiment it is present in an amount from about 15 to 20 percent by weight of the composition.

A suitably glossy coating having sufficient abrasion resistance can be achieved using such amounts of colloidal silica in the coating of the invention. In a preferred embodiment, abrasion resistance can be significantly improved by the dispersion of the colloidal silica in a matrix formed from acrylate or methacrylate functional monomers and oligomers. As used herein, "colloidal silica" should be understood to be distinct from "solid silica," which refers to compounds such as hydrous silicic acid and silicic anhydride that are not included within the colloidal silicas of the invention. "Colloidal silica" refers to silica disposed in a solvent. For coatings, the solvent typically includes water or one or more ketones, alcohols, or any combination thereof.

Coatings may be produced, for example, which contain small spherical particles of silica, linked to the organic matrix through a silane coupling agent interface. The nanometer size of the silica particles and the refractive index of said material are useful for clear coatings, since they do not cause light scattering and thus do not interfere with the light transmission in the way fillers of larger particle size do. For pigmented or tinted coatings this is not an issue. In a preferred embodiment of the invention, the colloidal silica microparticles range in size from about 1 nm to 200 nm. In one embodiment, the colloidal silica microparticles range in size from about 50 nm to 100 nm.

The colloidal silica is typically used in the invention dispersed in a solvent. The solvent can include monomer or oligomer, or both. The solvent can include water for water-reducible coatings. For dual cure systems, the solvent can be a monomer or oligomer. "Dual cure" refers to curing that includes a combination of at least heat and ultraviolet radiation. Those of ordinary skill in the art can readily determine other suitable solvents used with the colloidal silica, particularly with reference to the description of the invention herein.

Any hard material that is capable of being triturated and which has a hardness greater than that of the material forming the continuous phase of the coating may be optionally used in the present invention with the colloidal silica. In a preferred embodiment of the invention, a material having a Mohs hardness greater than or equal to about 5 is used. It is also preferred to use particulate matter which is capable of being bound to a continuous phase coating material through a use of a coupling reaction.

Optional hard particulate materials for use in the coating of the invention include, but are not limited to: Actinolite; Aegirine; Akermanite; Almandine; Analcite; Anatase; Andalusite; Andesine; Andradite; Anorthite; Anorthoclase; Anthophyllite; Apatite; Arsenopyrite; Augelite; Augite; Axinite; Baddeleyite; Benitoite; Bertrandite; Beryl; Beryllonite; Bixbyite; Boracite; Braunite; Bravoite; Breithauptite; Brookite; Cancrinite; Cassiterite; Celsian; Chloritoid; Chondrodite; Chromite; Chrysoberyl; Clinozoisite; Cobaltite; Columbite; Cordierite; Cordundum; Cristobalite; Cummingtonite; Danburite; Datolite; Derbylite; Diamond; Diaspore; Diopside; Dioptase; Enstatite; Epidote; Euclasite; Eudialite; Euxenite; Fayalite; Fergussonite; Forsterite; Franklinite; Gahnite; Gehlenite; Geikielite; Glaucophane; Goethite; Grossularite; Hambergite; Hausmannite; Haüyne; Hendenbergite; Helvite; Hematite; Hemimorphite; Hercynite; Herderite; Homblende; Humite; Hydrogrossularite; Ilmenite; Jadeite; Kaliophyllite; Kyanite; Lawsonite; Lazulite; Lazurite; Lepidocrocite; Leucite; Loellingite; Manganosite; Marcasite; Marialite; Meionite; Melilite; Mesolite; Microcline; Microlite; Monticellite; Nepheline; Niccolite; Nosean; Oligoclase; Olivine; Opal; Orthoclase; Orthopyroxene; Periclase; Pekovskite; Petalite; Phenakite; Piemontite; Pigeonite; Pollucite; Prehnite; Pseudobrookite; Psilomelane; Pumpellyite; Pyrite; Pyrochlore; Pyrolusite; Pyrope; Quartz; Rammelsbergite; Rhodonite; Rutile; Samarskite; Sapphirine; Scapolite; Silica; Sodalite; Sperrylite; Spessartite; Sphene; Spinel; Spodumene; Staurolite; Stibiotantalite; Tantalite; Tapiolite; Thomsonite; Thorianite (R); Topaz; Tourmaline; Tremolite; Tridymite; Ullmannite; Uraninite (R); Uvarovite; Vesuvianite; Wagernite; Willemite; Zircon; and Zoisite; and combinations thereof, as named in the table "Physical Constants of Minerals" from the *CRC HANDBOOK OF CHEMISTRY & PHYSICS, 52ND EDITION* 1971–1972 (P. 193–197) THE CHEMICAL RUBBER CO., CLEVELAND, OHIO.

In one preferred embodiment, the hard particulate material is present in the coating in an amount of about 2 to 25 weight percent in addition to the colloidal silica.

The colloidal silica is preferably combined with a coupling agent, which includes one or more compounds to aid in adhesion and dispersion of the filler particles. For purposes of the present invention, the term "coupling agents" as used herein preferably refers to compounds having a plurality of functionalities, at least one of which is capable of interacting or bonding to the surface of the colloidal silica, and at least one other functionality capable of interacting or bonding to the reactive component within the coating, such as the polymers or monomers that are included in the coating of the invention. Any coupling agent that is suitable for bonding to the surface of a colloidal silica material, the polymer precursor component, or to the coating matrix is suitable for use in the present invention. Suitable coupling agents include silane coupling agents, and optionally further include one or more of chromates, titanates, zirconium, zircoaluminate, and polymeric coupling agents.

Particularly preferred silane coupling agents have the formula $Y-(CH_2)_n SiX_3$, wherein Y is an organofunctional group providing the bonding with the polymer matrix attached to the central silicon atom via the stable $(CH_2)_n$ carbon chain (e.g., a substituted or unsubstituted aryl, alkyl or carbocyclic group) and X represents the silicon-functional or alkoxy group (e.g., $OCH_3$, $OC_2H_5$, $OC_2H_4OCH_3$) that hydrolyzes and subsequently reacts with the active sites on inorganic surfaces. The coupling agent has a polyvalent backbone including at least one of silicone and phosphorus radicals, alkyl groups having a chain length of 1 to 12 carbon atoms, and polymers and oligomers selected from the group consisting of acrylic, polyester, polyether, urethane, urea, polyamide, epoxy, and alkyd oligomers and polymer mixtures thereof. The first functionality on the backbone is reactive with colloidal silica, including at least one of hydroxy, phenoxy, hydroxy ether, silane or aminoplast functionalities. The second functionality on the backbone is reactive with one of the reactive components, including at least one of hydroxy, isocyanate, carboxyl, epoxy, amine, urea, vinyl, amide, amimoplast or silane functionalities.

For purposes of the present invention, the term "substituted or unsubstituted aryl" means a hydrocarbon ring bearing a system of conjugated double bonds, usually comprising six or more even number of B (pi) electrons. Examples of aryl groups include, but are not limited to, phenyl, naphthyl, anisyl, tolyl, xylenyl and the like. According to the present invention, aryl also includes heteroaryl groups, e.g., pyrimidine and thiophene. These aryl groups may also be substituted with any number of a variety of functional groups. Such functional groups can be epoxide, nitro, mercapto, amino, ureido, vinyl, isocyanato, or methacrycoxy groups, in addition to those discussed below used in conjunction with substituted alkyl and/or carbocyclic compounds.

"Alkyl" is used herein to mean linear chain or branched chain alkyl groups of from 1 carbon atom up to about 30 carbon atoms including any substituted or unsubstituted acyclic carbon-containing compounds, such as alkanes, alkenes and alkynes. Examples of alkyl groups include lower alkyl, for example, methyl, ethyl, n-propyl, iso-propyl, -butyl, iso-butyl or tert-butyl, pentyl, hexyl, heptyl, octyl, nonyl, decyl, and the like; upper alkyl, referring to carbon based molecules having from 20 to 30 carbon atoms; and lower alkylene, for example, ethylene, propylene, propyldiene, butylene, butyldiene, and the like. The ordinary-skilled artisan is familiar with numerous linear and branched alkyl groups which are within the scope of the present invention.

In addition, the alkyl group(s) may also contain various substituents in which one or more carbon and/or hydrogen atoms has been replaced by a functional group. Functional groups include but are not limited to hydroxyl, amino, carboxyl, amide, ester, ether, epoxide and halogen (fluorine, chlorine, bromine and iodine), to mention but a few. In a preferred mode of the present invention, R will be a linear or branched chain having from about 1 to 18 carbon atoms.

"Carbocyclic" is herein defined as substituted and unsubstituted carbocyclic groups of up to about 20 carbon atoms. The term as used herein means cyclic carbon-containing compounds, including but not limited to cyclopentyl, cyclohexyl, cycloheptyl, admantyl and the like. Such cyclic groups may also contain various substituents in which one or more hydrogen atoms has been replaced by a functional group. Such functional groups include those described above, as well as the lower alkyl groups described above. The cyclic groups of the invention may further comprise a heteroatom, for example, cyclohexanol.

The most preferred coupling agents for use with the invention include those sold under the tradename SILQUEST® organofunctional silanes by OSi Specialties, Danbury, Conn. SILQUEST® A-174, A-1230, A-171, A-187, A-1100 and A-189 are specific products available. Other preferred silane coupling agents include Z-6011, Z-6040, Z-6030 and Z-6020 silanes available from Dow Coming corporation of Midland, Mich.

Titanate coupling agents include, for example, monoalkoxy titanate compounds, chelate titanate compounds, quad titanate compounds, coordinate titanate compounds, neoalkoxy titanate compounds and cycloheteroatom titanate compounds, to name but a few. Such titanates are available, for example, from Du Pont Company of Wilmington, Del. under the tradename TYZOR, TPT, TBT and TOT.

Zirconium coupling agents may include, for example, zircoaluminates, zirconium propionate, neoalkoxy zirconate and ammonium zirconium carbonate, available from Magnesium Elektron, Inc. of Flemington, N.J.

Zircoaluminate coupling agents have both an aluminum and a zirconium functional group in addition to an organic functionality. Such zircoaluminate coupling agents are described, for example, in U.S. Pat. Nos. 4,539,048 and 4,539,049, issued Sep. 3, 1985, both of which are herein incorporated in their entirety by express reference thereto. The most preferable class of coupling agents are silicone based coupling agents, including aminosilanes, mercaptosilanes, glycidoxysilanes, epoxysilanes, methacryloxysilanes, vinylsilanes, and the like, or combinations thereof. This class includes alkoxysilane oligomers, nonionic silane dispersing agents, octyltriethoxysilane, methyltriethoxysilane, methyltrimethoxysilane, vinyltriethoxysilane, vinyltrimethoxysilane, vinyl-tris (2-methoxyethoxy) silane, gamma-methacryloxypropyltrimethoxysilane, beta-(3,4-epoxycyclohexyl) ethyltrimethoxysilane, gamma-glycidoxypropyltrimethoxysilane, gamma-mercaptopropyltrimethoxysilane, gamma-aminopropyltriethoxysilane, aminoalkyl silicone solutions, modified aminoorganosilane, gamma-aminopropyltrimethoxysilane, -beta-(aminoethyl)-gamma-aminopropyltrimethoxysilane, modified aminoorganosilane, modified aminosilanes, triaminofunctional silanes, aminofunctional silanes, polyazamide silanes, gamma-ureidopropyltriethoxysilane, isocyanatofunctional silanes; and mixtures thereof.

The weight ratio of the coupling agent to the colloidal silica solids can be any amount that will result in the formation of a suitable abrasion resistant coating upon a golf ball or club, or a portion thereof. Useful ratios of the coupling agent to the colloidal silica solids are about 1:1 to 1:90, or more preferably from about 1:1 to 1:40. In one embodiment, the ratio is about 1:6 and in another embodiment is about 1:12. The combination of the solids of colloidal silica and the coupling agent has a ratio to the resin solids combination of the resin and crosslinking agent. Useful ratios are about 1:1 to 1:50 and, more preferably, from about 1:1 to 1:10. In one preferred embodiment, the ratio is about 1:8, and in another embodiment, the ratio is about 1:4.

The coatings of this invention may further be obtained by evaporation of a water-based or an organic-solvent based system. They may also be obtained by an ultraviolet (UV) cure of a suitably reactive system. The coating may be applied as a clear or pigmented primer or as a topcoat or as a single layer combining the properties of both.

The amount of coating applied to a standard-sized golf ball (1.680 inch diameter) is in the range of 0.01 g to 1 g. Preferred reaction and coating conditions vary with both the chemical compositions and the application methodology but are well known in the art. The methodology for coating golf balls according to the present invention can be any that is known to the ordinary-skilled artisan and is acceptable for application of a liquid containing particulate matter. Golf ball coating application techniques include spray, electrostatic, dip, spin curtain and those methods described in for example U.S. Pat. Nos. 5,461,109, 5,409,233, 5,000, 458, 4,871,589, 4,798,386 and 5,300,325. All of the aforementioned patents, patent applications and other printed publications here and elsewhere in the Detailed Description are incorporated herein by express reference thereto.

In one embodiment, substantially all of the coating remains adhered to the golf ball after repeated hits with a golf club. "Substantially all" is herein defined as at least about 90 percent, preferably at least about 95 percent, and more preferably at least about 99 percent, of the coating remains adhered to the golf ball.

In one embodiment, the coating can be applied to a golf shaft, iron-type club, or a portion thereof. For example, the coating can be disposed over at least a portion of the back cavity of an iron-type club, the club face, the crown of a metal wood-type club, or the sole of a metal wood-type club to inhibit or avoid abrasion of the club itself.

EXAMPLE

These and other aspects of the present invention may be more fully understood with reference to the following non-limiting example, which is are merely illustrative of the preferred embodiments of the present invention, and is not to be construed as limiting the invention, the scope of which is defined by the appended claims.

Example 1

Comparison of Conventional Coating with Coating of the Invention

In order to test the abrasion resistance of the coatings of the present invention, the following experiment was performed following ASTM D4060-84 entitled "Standard Method for Abrasion Resistance Of Organic Coatings By The Taber Abraser." Two test plates were prepared. The first test plate (steel) was coated with a conventional urethane-based low VOC primer commercially available as S24989 from PPG Industries of Pittsburgh, Pa. The second test plate (steel) was coated with a mixture, which contained 20% colloidal silica particles (NYACOL 2040), 1% organofunctional silane (SILQUEST® A-187) and the remainder conventional urethane-based low VOC. Both plates were coated using a conventional draw down blade and had a cured coating thickness of about 6–8 mils.

A CS-17 abrasive wheel was selected and both plates were subjected to 400 cycles in accordance with the procedures set forth in ASTM D4060-84. The test plates were weighed before and after testing. These weights as well as the total change in weight appear in Table I below.

| Test Plate | Weight Before Abrasion | Weight After Abrasion | Total Change in Weight |
|---|---|---|---|
| Control (100% Primer) | 16.04887 g | 16.04634 g | $2.53 \times 10^{-3}$ g |
| Sample 1 (20% NYACOL 2040; 1% SILQUIEST A-187) | 16.05623 g | 16.05458 g | $1.65 \times 10^{-3}$ g |

As illustrated in Table I, the total change in weight for Sample 1 was more than 50% less weight as compared to the control and therefore had superior abrasion resistant properties.

Although preferred embodiments of the invention have been described in the foregoing Detailed Description, it will be understood that the invention is not limited to the embodiments disclosed, but is capable of numerous rearrangements and modifications of parts and elements without departing from the spirit of the invention. Furthermore, it will be understood that the mechanical or chemical details of every coating composition or golf ball preparation may be slightly different or modified by one of ordinary skill in the art without departing from the method taught by the present invention.

What is claimed is:

1. Golf equipment, or a portion thereof, having a coating which comprises:
    a reactive component A comprising a polyol or a mixture of polyol components and polymer precursors;
    a reactive component B comprising an isocyanate component which comprises at least one of diphenylmethane 4,4'-diisocyanate, toluene diisocyanate, isophorone diisocyanate, hexamethylene diisocyanate, or mixtures thereof, wherein the reactive component B optionally includes an aziridine;
    colloidal silica present in an amount of about 5 percent or greater sufficient to increase the abrasion resistance of the coating;
    a coupling agent present in an amount sufficient to react with the colloidal silica; and
    a solvent,
    or a reaction product thereof.

2. The golf equipment of claim 1, wherein the golf equipment is a golf ball and the coating is disposed over an outer dimpled cover surrounding a core of the golf ball.

3. The golf equipment of claim 1, wherein the reactive component A comprises at least one of a hydroxyl functional acrylic, hydroxyl functional polyester, hydroxyl functional polyether, polyamine, polyamide, alkyd, epoxy resin with secondary hydroxyl group(s), phenolic resin, hydroxyl functional resin, or mixtures thereof.

4. The golf ball of claim 2, wherein the colloidal silica microparticles have a size from about 1 nm to 200 nm prior to incorporation in the coating.

5. The golf ball of claim 2, wherein the colloidal silica microparticles have a size from about 50 nm to 100 nm.

6. The golf ball of claim 2, wherein the colloidal silica microparticles are present in aggregates ranging in diameter from about 5 nm to 50 nm and are present about 5 to 60 percent by weight based on the sum of the weights of reactive component A and reactive component B.

7. The golf ball of claim 2, wherein the coupling agent comprises a backbone portion which is a polyvalent linking group having a first functionality reactive with the colloidal silica and a second functionality reactive with at least one of the reactive components.

8. The golf ball of claim 7, wherein the colloidal silica comprises SiOH reactive functionality, and wherein the coupling agent has a polyvalent backbone comprising at least one of silicone and phosphorus radicals, alkyl groups having a chain length of from 1 to 12 carbon atoms, polymers and oligomers selected from the group consisting of acrylic, polyester, polyether, urethane, urea, polyamide, epoxy, and alkyd oligomers and polymer mixtures thereof;
    a first functionality on the backbone, reactive with colloidal silica, comprising at least one of hydroxy, phenoxy, hydroxy ether, silane or aminoplast functionalities; and
    a second functionality on the backbone, reactive with one of the reactive components, comprising at least one of hydroxy, isocyanate, carboxyl, epoxy, amine, urea, vinyl, amide, amimoplast or silane functionalities.

9. The golf ball of claim 8, wherein the coupling agent has the formula $Y\text{---}(CH_2)_n SiX_3$, wherein Y is an organofunctional group providing the bonding with the polymer matrix attached to the central silicon atom via the stable $(CH_2)_n$ carbon chain and X represents the silicon-functional or alkoxy group that hydrolyzes and subsequently reacts with the active sites on inorganic surfaces.

10. The golf ball of claim 2, wherein the coating comprises a ratio of a weight of the coupling agent to a weight of the colloidal silica of from about 1:1 to 1:90.

11. The golf ball of claim 2, wherein the coating is cured by solvent evaporation from a water-based or organic based solvent system.

12. The golf ball of claim 2, wherein the coating further comprises optical brightener.

13. The golf ball of claim 2, wherein the coating further comprises at least one of a pigment, dye, tint, or filler, each in an amount sufficient to provide the coating with visible pigmentation.

14. The golf ball of claim 2, wherein substantially all of the coating remains adhered to the golf ball after repeated hits with a golf club.

15. The golf equipment of claim 1, wherein the equipment is a golf club, or portion thereof.

16. A method of forming the top coat for golf equipment, or a portion thereof, which comprises:

mixing a liquid reactive component A, a liquid reactive component B, colloidal silica in an amount of about 5 percent or greater, a coupling agent, and a solvent system to form a liquid top coat material;

applying the material to an outer surface of the golf equipment to form a coating; and curing the coating in situ on the outer surface of the golf equipment.

17. The method of claim 16, wherein the applying comprises at least one of spraying, brushing, or dipping the material onto the outer surface.

18. The method of claim 16, wherein the reactive component A comprises a mixture of polyol components and polymer precursors and the polymer precursors are monomers or oligomers that are cured by ultraviolet radiation, electron beam radiation, heat, or a combination thereof.

19. The method of claim 16, wherein the curing comprises solvent evaporation from a water-based or organic based solvent system.

20. The method of claim 16, wherein the curing comprises heat or ultraviolet radiation.

21. The method of claim 16, wherein the curing comprises forming the colloidal silica, coupling agent, and reactive components A and B into a matrix having a hardness less than the colloidal silica.

22. The method of claim 16, wherein the curing occurs at a temperature of about 32° F. to 132° F.

23. The golf equipment of claim 1, wherein the colloidal silica has a particle size of about 1 nanometer to about 200 nanometers.

24. The golf equipment of claim 23, wherein the colloidal silica has a particle size of about 50 nanometers to about 100 nanometers.

25. The golf equipment of claim 1, wherein the colloidal silica is present in an amount greater than about 5 percent by weight of the coating.

26. The golf equipment of claim 1, wherein the colloidal silica is present in an amount from about 5 percent to about 80 percent by weight of the coating.

27. The golf equipment of claim 26, wherein the colloidal silica is present in an amount from about 10 percent to about 30 percent by weight of the coating.

28. The golf equipment of claim 1, wherein the colloidal silica does not cause light scattering.

29. The method of claim 16, wherein the colloidal silica has a particle size of about 1 nanometer to about 200 nanometers.

30. The method of claim 16, wherein the colloidal silica does not cause light scattering.

31. Golf equipment, or a portion thereof, having a coating formed from an abrasion resistant composition comprising:

a polyol or a mixture of a polyol and at least one polymer precursor;

an isocyanate;

colloidal silica present in an amount of about 5 percent or greater by weight of the composition;

a coupling agent present in an amount sufficient to react with the colloidal silica; and a solvent, or a reaction product thereof.

32. The golf equipment of claim 31, wherein the golf equipment is a golf ball and the coating is disposed over an outer cover of the golf ball.

33. The golf equipment of claim 31, wherein the polyol comprises at least one of a hydroxyl functional acrylic, hydroxyl functional polyester, hydroxyl functional polyether, polyamine, polyamide, alkyd, epoxy resin with secondary hydroxyl group(s), phenolic resin, hydroxyl functional resin, or mixtures thereof.

34. The golf equipment of claim 31, wherein the colloidal silica has a particle size of about 1 nanometer to about 200 nanometers.

35. The golf equipment of claim 34, wherein the colloidal silica has a particle size of about 50 nanometers to about 100 nanometers.

36. The golf equipment of claim 31, wherein the colloidal silica is present in an amount from about 5 percent to about 80 percent by weight of the coating.

37. The golf equipment of claim 31, wherein the colloidal silica does not cause light scattering.

38. The golf equipment of claim 31, wherein the coating further comprises an optical brightener.

39. The golf equipment of claim 31, wherein the coating is cured by solvent evaporation from a water-based or organic-based solvent system.

40. The golf equipment of claim 32, wherein the coupling agent comprises a backbone portion comprising a polyvalent linking group having a first functionality reactive with the colloidal silica and a second functionality reactive with at least one of the polyol or the isocyanate.

41. Golf equipment, or a portion thereof, having a coating formed from an abrasion resistant composition comprising:

a polyol;

an isocyanate;

colloidal silica having a particle size of about 1 nanometer to about 200 nanometers, wherein the colloidal silica is present in an amount of about 5 percent to about 80 percent by weight of the composition;

a coupling agent present in an amount sufficient to react with the colloidal silica; and a solvent.

42. The golf equipment of claim 41, wherein the golf equipment is a golf ball and the coating is disposed over an outer cover of the golf ball.

43. The golf equipment of claim 41, wherein the colloidal silica has a particle size of about 50 nanometers to about 100 nanometers.

44. Golf equipment, or a portion thereof, having a coating formed from an abrasion resistant composition comprising:

a polyol;

an isocyanate;

colloidal silica having a particle size of about 1 nanometer to about 200 nanometers present in an amount of about 5 percent or greater by weight of the composition;

a coupling agent; and a solvent.

45. The golf equipment of claim 44, wherein the golf equipment is a golf ball and the coating is disposed over an outer cover of the golf ball.

46. The golf equipment of claim 44, wherein the colloidal silica has a particle size of about 50 nanometers to about 100 nanometers.

* * * * *